US010717516B2

(12) United States Patent
Violette et al.

(10) Patent No.: US 10,717,516 B2
(45) Date of Patent: Jul. 21, 2020

(54) COMPOSITE PROPULSOR BLADE SUPPORT STRUCTURE AND SYSTEM

(71) Applicant: Rotating Composite Technologies, LLC, Kensington, CT (US)

(72) Inventors: John A. Violette, Granby, CT (US); Eric Stephen Loos, Glastonbury, CT (US)

(73) Assignee: ROTATING COMPOSITE TECHNOLOGIES, LLC, Kensington, CT (US)

( * ) Notice: Subject to any disclaimer, the term of this patent is extended or adjusted under 35 U.S.C. 154(b) by 168 days.

(21) Appl. No.: 15/949,136

(22) Filed: Apr. 10, 2018

(65) Prior Publication Data

US 2018/0290728 A1 Oct. 11, 2018

Related U.S. Application Data

(60) Provisional application No. 62/483,751, filed on Apr. 10, 2017.

(51) Int. Cl.
*B64C 11/06* (2006.01)

(52) U.S. Cl.
CPC .................... *B64C 11/06* (2013.01)

(58) Field of Classification Search
CPC ......... F01D 5/30; F01D 5/3023; B63C 11/06; B63C 11/04; B63C 11/10; B63C 11/12; B63C 11/20; B63C 11/24; B63C 11/26; B63C 27/46; B63C 2027/4736; Y02T 50/672; Y02T 29/49332
See application file for complete search history.

(56) References Cited

U.S. PATENT DOCUMENTS

| 3,734,642 A * | 5/1973 | Dixon ..................... B64C 11/04 416/61 |
| 4,524,499 A * | 6/1985 | Grimes ................... B64C 11/26 29/450 |
| 4,717,312 A * | 1/1988 | Seeley .................... B64C 11/06 416/145 |
| 4,921,403 A * | 5/1990 | Poucher .................. B64C 11/06 416/147 |
| 5,415,527 A * | 5/1995 | Godwin .................. B64C 11/06 416/205 |

(Continued)

*Primary Examiner* — Igor Kershteyn
(74) *Attorney, Agent, or Firm* — MKG, LLC (57) ABSTRACT

A support structure for a propulsor blade includes at least one sleeve configured to support a root portion of the propulsor blade, the at least one sleeve fixedly attached to a surface of the root portion. The support structure also includes a preloading component configured to apply a residual compressive force to the at least one sleeve and the root portion of the propulsor blade, the residual compressive force configured to maintain an attachment of the at least one sleeve to the root portion. The propulsor blade and root portion may incorporate composite structural materials. The support structure and/or the preloading component increases the high cycle fatigue strength and bending capacity of blade retention assemblies (including, e.g., composite-to-metal joints) when subjected to high cycle bending loads under reduced centrifugal load conditions, thereby making further reductions in the size and weight of blade retention assemblies feasible.

20 Claims, 8 Drawing Sheets (56) References Cited

U.S. PATENT DOCUMENTS

| | | | | |
|---|---|---|---|---|
| 6,015,264 A * | 1/2000 | Violette | ............... | B64C 11/06 |
| | | | | 384/517 |
| 6,305,905 B1 * | 10/2001 | Nagle | ............... | B64C 11/04 |
| | | | | 416/204 R |
| 6,443,701 B1 * | 9/2002 | Muhlbauer | ............... | B64C 11/06 |
| | | | | 416/230 |
| 6,676,080 B2 | 1/2004 | Violette | | |
| 8,753,088 B2 * | 6/2014 | Pfeiffer | ............... | B64C 11/06 |
| | | | | 416/209 |
| 9,849,969 B2 * | 12/2017 | Nagle | ............... | B64C 11/26 |

* cited by examiner

COMPOSITE PROPULSOR BLADE SUPPORT STRUCTURE AND SYSTEM

CROSS REFERENCE TO RELATED APPLICATION

This application claims the benefit of U.S. provisional application No. 62/483,751, filed Apr. 10, 2017, the contents of which is incorporated herein by reference in its entirety.

TECHNICAL FIELD

This invention relates in general to bladed rotor systems including composite-bladed rotor systems, such as propulsive thrust systems used in aircraft, helicopters, and aircraft engines, and in particular to the root end structural assembly of such blades having a joint, which includes a preloading feature that increases the structural bending capacity of the joint.

BACKGROUND

Composite materials are used in propulsive blade systems in aircraft and confer a number of benefits, including weight reduction and corresponding fuel efficiency. In systems that incorporate a blade variable-pitch feature, the base portions or root portions of propulsor blades typically terminate in a cylindrical shape to accommodate a variety of low friction bearing assemblies that generally include ball and/or roller elements. These bearing assemblies interface with individual blade sockets or "arms" of a central hub assembly that retains the blades and allow each blade to be rotatable about the bearing axis. A variable-pitch propulsive blade system includes a pitch control system that allows the pitch angle of all blades to be varied simultaneously to maximize thrust for different aircraft operating conditions, resulting in greater aircraft propulsive efficiency. In some VTOL (Vertical Take-Off and Landing) aircraft applications, such as helicopters, the pitch angle of each blade in multiple-bladed lift rotors can be varied in a cyclic manner to affect the direction of thrust for the purpose of controlling the direction of flight. This method of blade pitch change is referred to as cyclic-pitch control.

An example of a propulsive blade assembly designed to reduce weight is discussed in U.S. Pat. No. 6,676,080, issued Jan. 13, 2004, entitled "Composite Airfoil Assembly," which is incorporated herein in its entirety.

However, because outer airfoil portions of composite blades are typically very lightweight, there is significantly less centrifugal load developing at the blade root portion than the centrifugal force that develops with older, solid or hollow metal blades, or blades with metal spars covered with composite shells. When root bending loads are high, the centrifugal load at the root joint of a blade may be insufficient to ensure the integrity of the connection between the blade and a hub assembly or other support mechanism, especially in cases where blade vibratory excitations are high and blade response results in increased bending loads that can adversely affect the composite-to-metal root joint within the blade root portion that interfaces with the hub assembly.

SUMMARY

An embodiment of a retention assembly for a propulsor blade according to the present invention includes at least one sleeve configured to retain a root portion of the propulsor blade, the at least one sleeve fixedly attached to a surface of the root portion. The retention structure also includes a preloading component configured to apply a residual compressive force to the at least one sleeve and the root portion of the propulsor blade, the residual compressive force configured to maintain an attachment of the at least one sleeve to the root portion.

An embodiment of a blade assembly according to the present invention includes a propulsor blade and at least one sleeve configured to retain a root portion of the propulsor blade, the at least one sleeve fixedly attached to a surface of the root portion. The blade assembly also includes a preloading component configured to apply a residual compressive force to the at least one sleeve and the root portion of the propulsor blade, the residual compressive force configured to maintain an attachment of the at least one sleeve to the root portion.

An embodiment of a device for facilitating attachment of a retention assembly to a propulsor blade assembly according to the present invention includes a preloading component configured to at least partially surround a portion of the retention assembly and a root portion of the propulsor blade, the preloading component configured to apply a residual compressive force to the portion of the retention assembly and the root portion. The residual compressive force acts to maintain a compressive load on the portion of the retention assembly and the root portion to prevent separation of the portion of the retention assembly from the root portion due to a variation in centrifugal forces during rotation of the propulsor blade.

Embodiments described herein that incorporate the preloading component present a number of advantages. For example, the embodiments described herein increase the high cycle fatigue strength and bending capacity of blade retention assemblies (including, e.g., composite-to-metal joints) when subjected to high cycle bending loads under reduced centrifugal load conditions, thereby making further reductions in the size and weight of blade retention assemblies feasible.

DETAILED DESCRIPTION

Described herein are devices, methods and systems for operating and increasing the root joint bending strength of propulsor blades. Such propulsor blades may be composite blades, such as composite blades used in aircraft propulsion systems (e.g., propellers, lift rotors or ducted fans) and composite blades used in green energy capturing devices such as wind turbines and water turbines. The propulsor blades may be made from one or more composite materials.

The devices, methods and systems described herein include a preloading feature or component operably connected to a root end of each blade in a propulsor blade assembly and operably connected to a blade retention assembly (e.g., a root joint assembly or a propeller hub) of the propulsor blade assembly. The preloading component may be used in rotor systems having blades made from materials such as metal and/or composite materials. In one embodiment, the preloading component is incorporated into composite-bladed rotor systems, such as propulsive thrust systems used in aircraft, helicopters, and aircraft engines, and in particular to the root end structural assembly of such blades. The preloading component may be used to reinforce the composite-to-metal joint design in such assemblies and increase the structural bending capacity of the joint, which allows a reduction in the size and weight of the blade root and mating retention system. This also allows tighter packaging in the design of new propulsion systems, where the trend is to increase the number of blades in propellers and ducted fans, thereby improving performance and efficiency while reducing weight.

An embodiment of a variable-pitch, composite-bladed propulsor system (e.g., an aircraft propulsion system or ducted fan system) includes two or more propulsor blades, each having a composite-to-metal joint that is integral to the blade root portion of each propulsor blade (e.g., a propeller blade or a fan blade). The blade retention assembly may interface with a bearing assembly in the hub or other connection component in a propulsion system or other system that utilizes rotating blades. The blade retention assembly includes a composite-to-metal root joint structure, such as one or more rings or inner and outer metal sleeves that may be bonded to the composite blade structure at the blade root. The preloading component interacts with at least one of the sleeves or other parts of the composite-to-metal root joint structure, and is designed to provide a compressive load in addition to the compressive force that develops on the composite material at the root of the blade when it rotates and blade centrifugal load develops. Compressive force developed in this manner and enhanced by the preloading component helps retain the composite blade and increases the strength of the composite-to-metal bond joint. In one embodiment, the blade retention assembly includes at least one sleeve that is adhered to or otherwise attached to the outer composite surface of the root portion of the blade. The blade retention assembly (including, e.g., a composite-to-metal root structure) includes a preloading component configured as a preloading ring or other structure that applies a residual compressive force and is integrally molded or otherwise installed circumferentially around the outer root end of an outer sleeve that is bonded to the root.

In one embodiment, the blade retention assembly includes an outer sleeve adhered to or otherwise attached to an outer surface of the composite root portion of the blade and/or an inner sleeve adhered to or otherwise attached to an inner surface of the composite root portion. The preloading ring is installed via threads or another suitable connection mechanism onto the outer sleeve and maintains a residual compressive force that acts to maintain a substantial residual compressive force between the inner and outer sleeves and also presses the inner sleeve against the inner composite wrap material, which in turn presses against the inner surface of the outer sleeve irrespective of centrifugal forces on the blade.

The preloading ring may engage both the outer sleeve and the inner sleeve to realize the residual compressive force. For example, the blade forms a composite loop at an inboard end of the blade, and the outer sleeve is adhered to an outer surface of the loop. The inner sleeve is adhered to an inner surface of the loop and to an inboard surface of the loop. The preloading ring includes a flange or other feature configured to engage the inner sleeve as the preloading ring is installed, and pull the inner sleeve outward toward the outer sleeve to achieve residual compression against the inboard surface of the loop, which in turn produces residual compression between the outer surface of the loop and the mating inner surface of the outer sleeve. The inner and outer sleeves may be indexed to each other to prevent relative rotation therebetween.

It is noted that an "inboard" position refers to a position along a longitudinal axis of the blade that is closer to a base of a blade and a hub than a reference location, and an "outboard" position refers to a position along the longitudinal axis that is further from the base and the hub than the reference location. An "outer" position refers to a position radially further away from the longitudinal axis than a reference location, and an "inner" position refers to a position radially closer to the longitudinal axis than the reference location.

Figure 1:
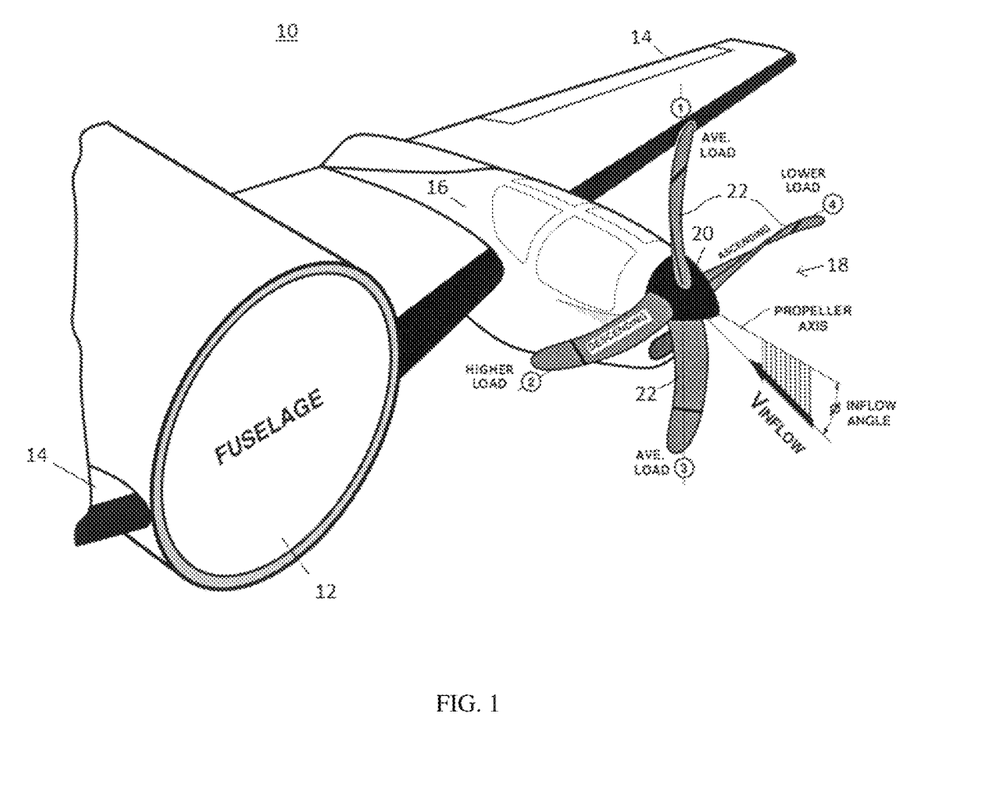
FIG. 1 is a perspective view of aspects of an aircraft and a propulsion system operating in a climb condition.

FIG. 1 shows an example of an aircraft 10 having a fuselage 12, wings 14 and an engine nacelle 16 mounted on each wing 14. The nacelle 16 houses a turbine engine and gearbox (not shown) and a propeller 18 with hub and spinner assembly 20 mounted to a gearbox flange. The propeller 18 includes a plurality of rotor blades 22. In this example, a four-blade propeller is shown, although embodiments described herein are applicable to other propeller types and other types and numbers of blades (e.g., ducted fan blades and vertical take-off and landing (VTOL) rotor blades).

FIG. 1 illustrates conditions that can cause bending loads to develop during various aircraft operating conditions. In this example, the aircraft 10 is in a climb condition, during which airflow into the propeller 18 enters at an angle below the rotational axis of the propeller 18.

Cyclic bending loads (vibratory loads) develop on each blade 22 due to rotation of the blade 22 and forces exerted by air flow on each blade. Under climb conditions, and other conditions such as maneuvering conditions, the propeller 18 experiences vibratory bending loads during propeller rotations that can cause high-cycle bending fatigue of blade structures.

Cyclic bending loads develop on a blade 22 based on the position of the blade 22. FIG. 1 shows four azimuthal positions that a blade 22 passes through during a climb condition. The propeller 18 is turning clockwise as viewed from behind the aircraft 10, and because the nose of the aircraft 10 is pointed upward during climb, the direction of air flowing into the propeller 18 is parallel to an imaginary line labeled "$V_{INFLOW}$" that is at an angle Ø (referred to as an "inflow angle") relative to the rotational axis of the propeller 18. During a full 360-degree rotation, each blade travels respectively through four angular or rotational positions, referred to as Positions 1-4.

Figure 2:
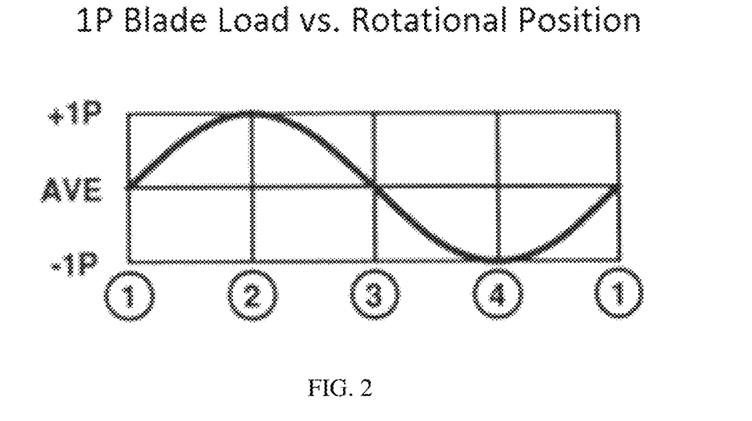
FIG. 2 is a graph depicting vibratory loads on propeller blades of the system of FIG. 1 during the climb condition.

These blades are subjected to a relative increase and a decrease of angle Ø in local angle of attack during each revolution, resulting in an alternating increase and decrease in blade loads with each revolution. Whereas at the top and bottom positions each blade only experiences an average load. Similar cyclic blade loading occurs when the aircraft is turning left or right FIG. 2 is a graph of the load magnitude on a blade 22 due to angular air inflow as a function of rotational or angular position of the blade, which demonstrates the cyclic nature of this type of loading. As shown, during a climb condition, blade airfoils in Positions 1 and 3 are subject to a load due to air inflow that is more or less average. When at Position 2, a blade airfoil is descending, and is subject to a greater air inflow angle and accordingly a greater load than the airfoils at Positions 1 and 3. A blade airfoil at Position 4 is ascending during the climb, is subject to a lesser air inflow angle, and is thus subject to a smaller load than the airfoils at Positions 1 and 3. Therefore, the airfoil of descending blade in Position 2 absorbs more torque and creates greater thrust than any of the other blades, while the airfoil of the ascending blade in Position 4 absorbs less torque and creates the least thrust. The blades at Positions 2 and 4 are subjected to a relative increase and a decrease of angle Ø in the local angle of attack during each revolution, resulting in an alternating increase and decrease in blade loads, sometimes referred to as "once-per-rev" loading or simply "1P" loading. This type of loading causes blade high-cycle fatigue bending. At the top and bottom positions (Positions 1 and 3), each blade only experiences an average load. Similar cyclic blade loading occurs when the aircraft is turning left or right. In the case of a turn maneuver, the positive and negative peaks shown in FIG. 2 are shifted 90 degrees from the horizontal positions shone for the climb condition in FIG. 2, i.e., high and low loads occur at Positions 1 and 3.

FIGS. 3-11 illustrate embodiments of a blade retention system or blade retention assembly and a preloading component configured to apply a compressive force to a base portion of a propulsor blade to compensate for variations in loading on the blade that can cause bending fatigue, reduced efficiency and/or failure. In these embodiments, the propulsor blade is the propeller blade 22, but is not so limited, and can be any type of blade that is subject to rotation.

Figure 3:
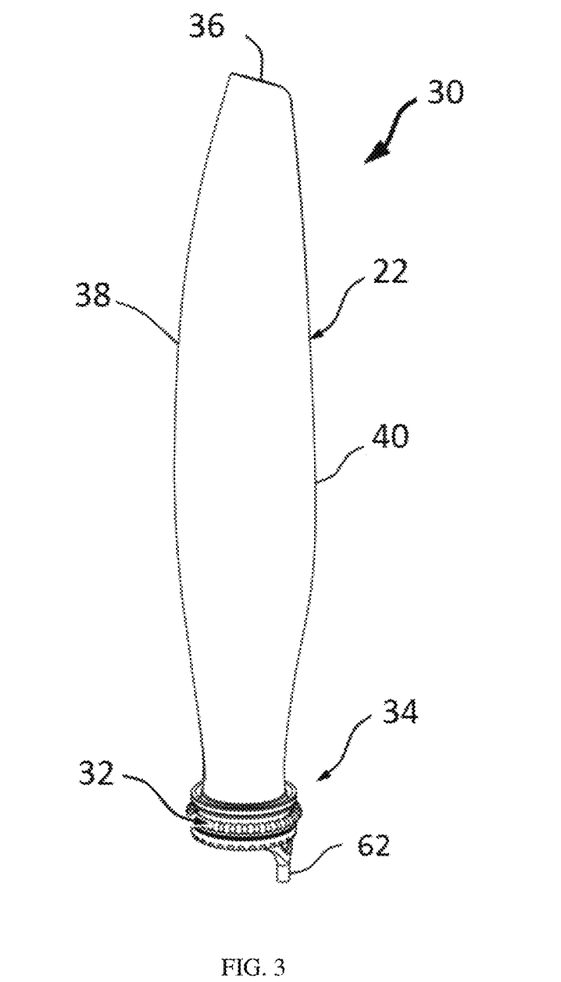
FIG. 3 is a side view of an embodiment of a complete composite propulsor blade structural assembly with a support bearing, allowing rotation about the blade longitudinal axis, a pitch change pin and root end feature incorporated in accordance with the present invention.

FIG. 3 shows an embodiment of a blade assembly 30 that includes the blade 22 in operable connection with a blade retention assembly 32, also referred to herein as a root assembly. The blade 22 may be constructed of a composite material and adapted for connection to a hub arm of a propulsion system, such as that shown in FIG. 1. The propulsion system may be one of a variety of aircraft propulsion systems, such as a propeller, a ducted fan, a helicopter rotor, a disk structure of a jet engine compressor fan assembly, or the like.

The blade 22 includes a root portion 34 or root area (i.e., a base portion) that is securely mounted to the blade retention assembly 32, a tip 36, and a leading edge 38 and a trailing edge 40 that extend between the root portion 34 and the tip 36. The blade 22, in one embodiment, is cylindrical in shape at the root portion 34 and transitions to an airfoil that thins, twists and flattens toward the tip 36 in a well-known manner, depending on the type of propulsor blade to be constructed. The blade retention assembly 32 is configured to receive the root portion 34 of the blade 22 and secure the blade 22 to the hub 20.

An outer portion of the blade, or a structural spar within the blade, is preferably constructed of layers of braided high-strength composite fibers such as glass, Kevlar™, carbon or the like, and layers of similar high-strength fibers that are uni-directional (in a form that are either woven or otherwise bound for ease of handling), positioned between the braided layers and oriented primarily along the blade axis. The braided and uni-directional composite layers are preferably continuous and are embedded in a suitable resin material. Those knowledgeable in the art of designing and analyzing high-strength composite structures can select and combine various composite fibrous materials and resin candidates that are compatible in order to optimize the blade's tensile and torsional stiffness properties, as well as the strength, toughness, durability and other required characteristics of the blade, including acceptable, tuned, resonant frequencies and deflections, while minimizing or reducing residual thermal stresses that can develop during high temperature processing.

Figure 4:
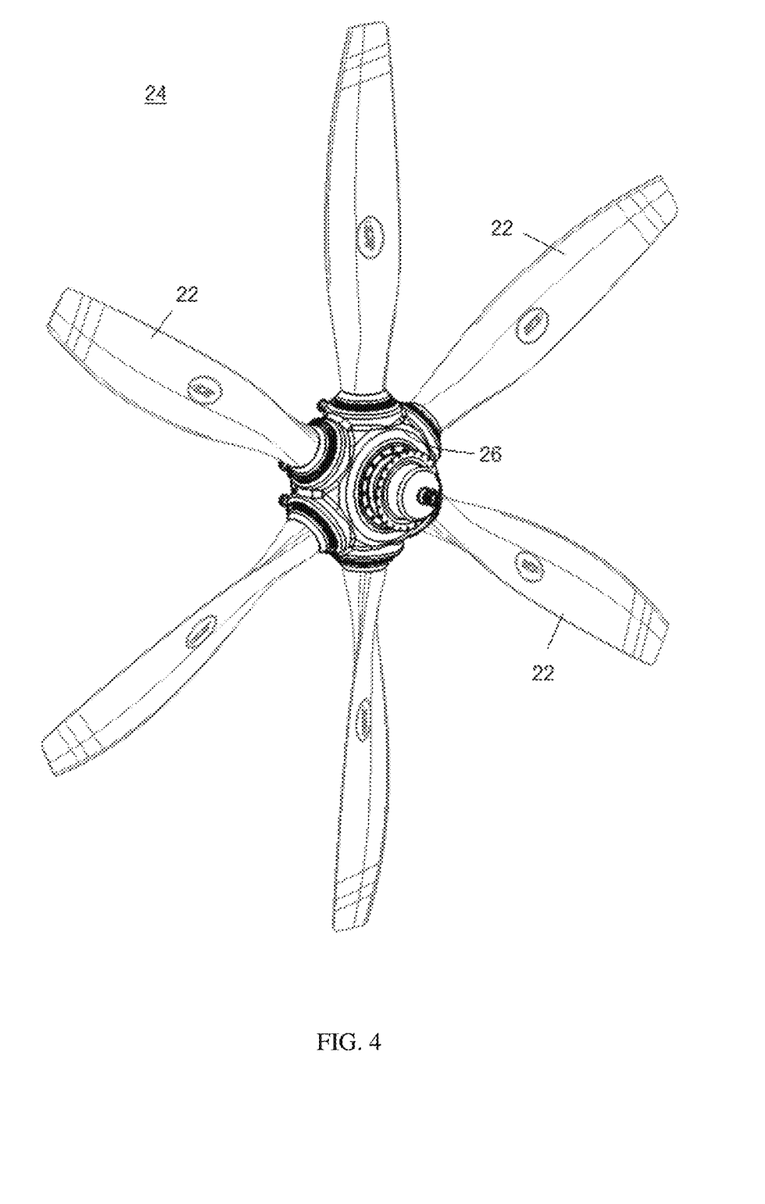
FIG. 4 is a perspective view of an example of a propulsor system configured as a propeller assembly having six blades supported by a central metallic hub.
Figure 5:
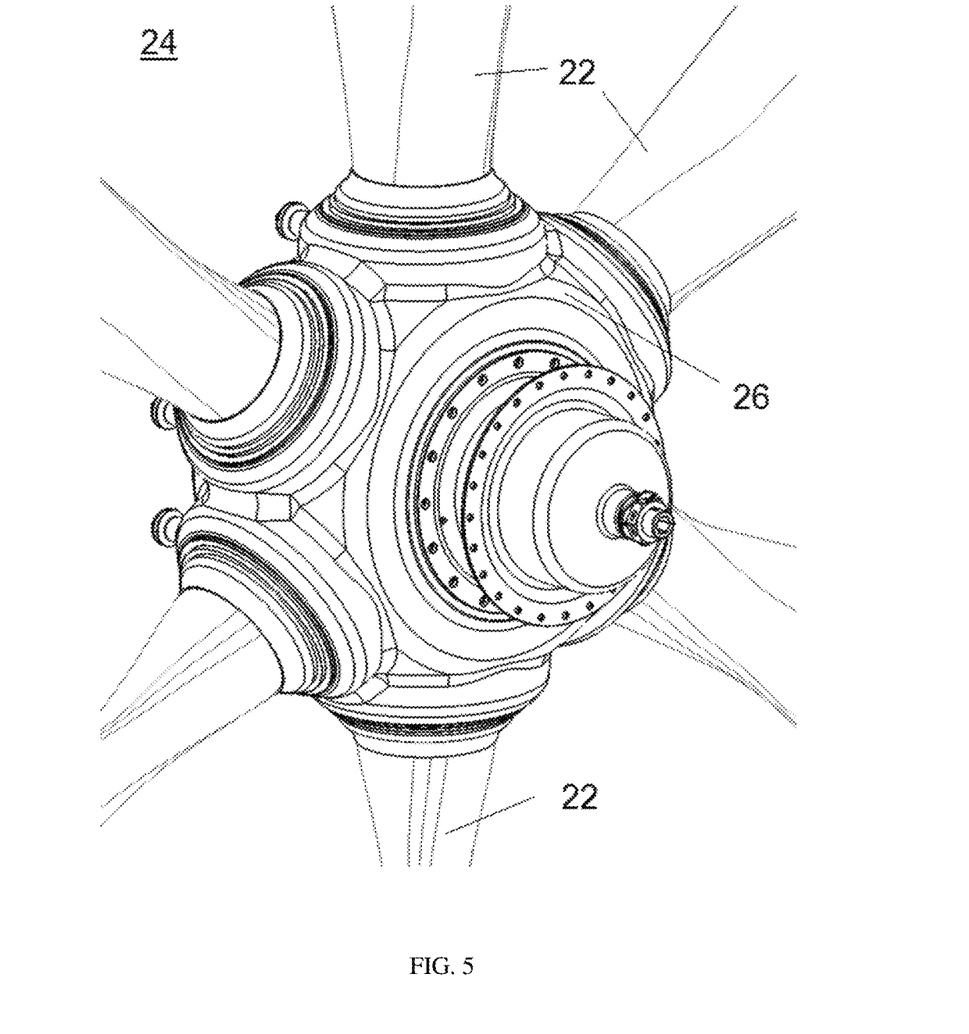
FIG. 5 is a close-up perspective view of the central region of the propulsor system of FIG. 4.

FIGS. 4 and 5 show an example of a propulsor system 24 in which embodiments described herein can be incorporated. In this example, the propulsor system 24 includes six blades 22 supported by a central metallic hub 26. The hub 26 has an internal mechanism (not shown) that allows the pitch of all six blades to be adjusted and controlled for each aircraft flight condition. In one embodiment, the internal mechanism is configured to engage a pitch change pin or other structure (e.g., pin 62 as described further below) connected to the root portion of each blade 22 (e.g., the root portion 34). Note that in this example, an outer shell structure (not shown), typically called a spinner nosecone, which forms a smooth aerodynamic shape over the hub and blade roots, is mounted on the hub 26.

Figure 6:
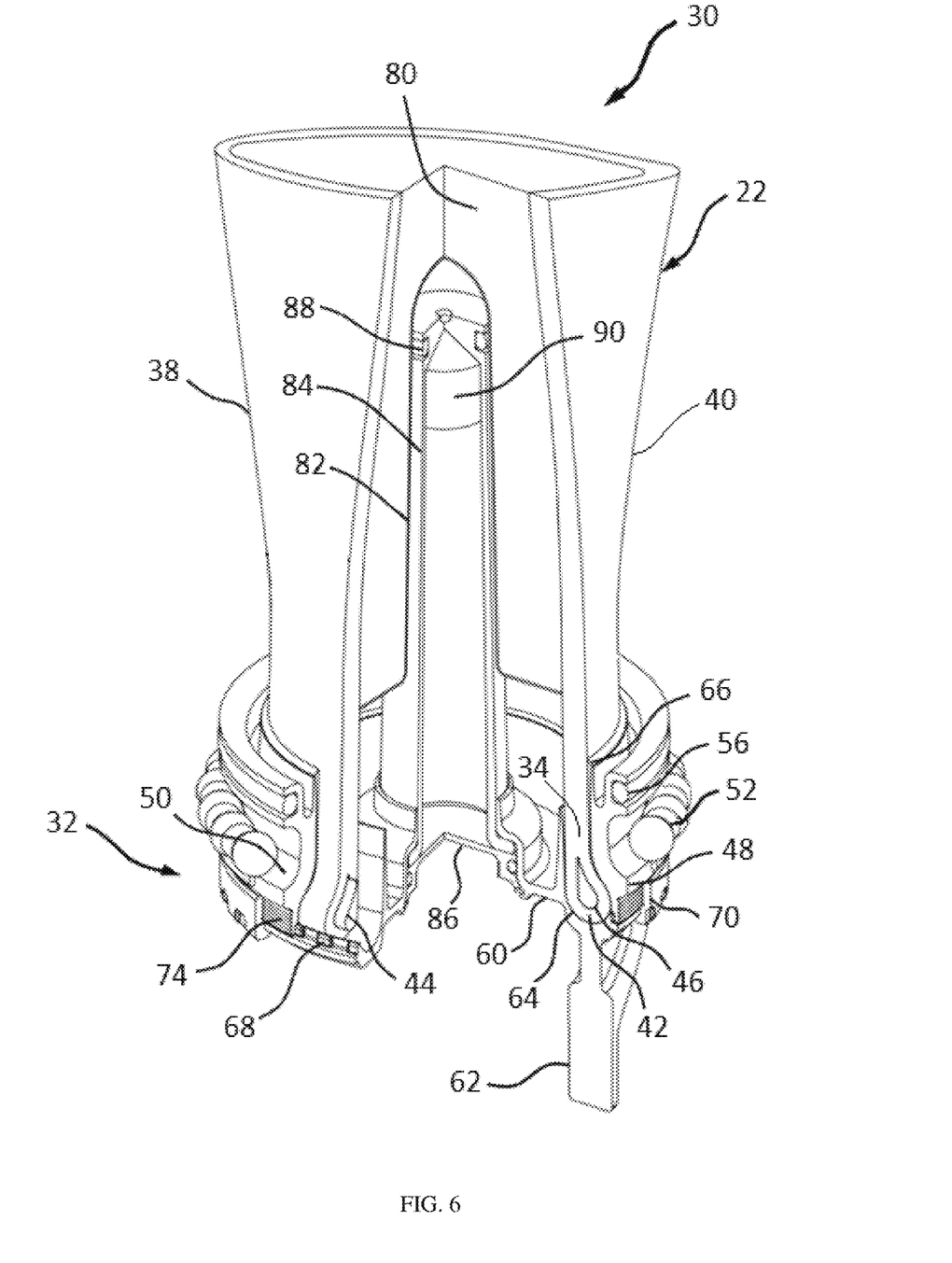
FIG. 6 is a perspective view in partial cross-section of a lower portion of the composite propulsor blade assembly of FIG. 3 and aspects of an embodiment of a blade retention assembly in accordance with the present invention.
Figure 7:
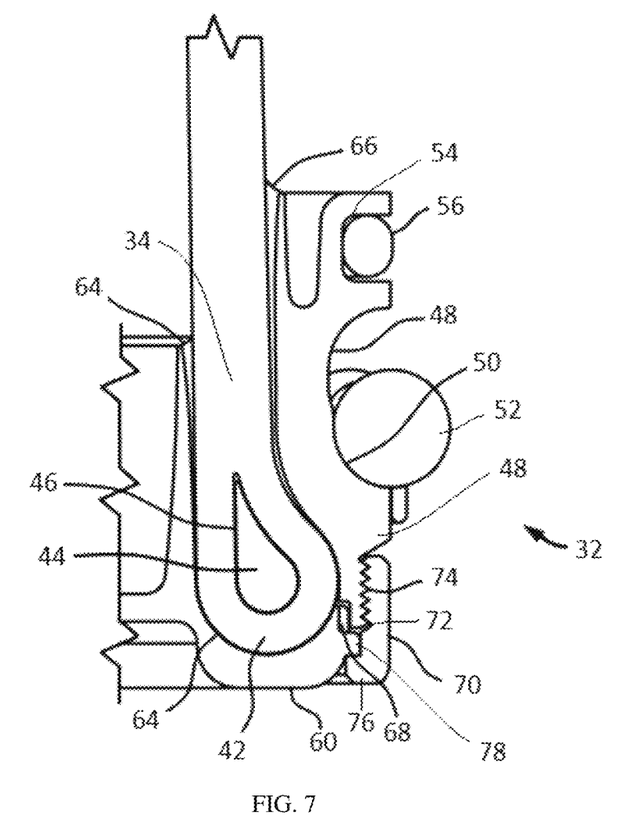
FIG. 7 is an enlarged cross-sectional view of a root portion of the propulsor blade assembly of FIGS. 3 and 6, and aspects of the blade retention assembly of FIG. 6 including a threaded preloading ring having threading and a preloading feature.
Figure 8:
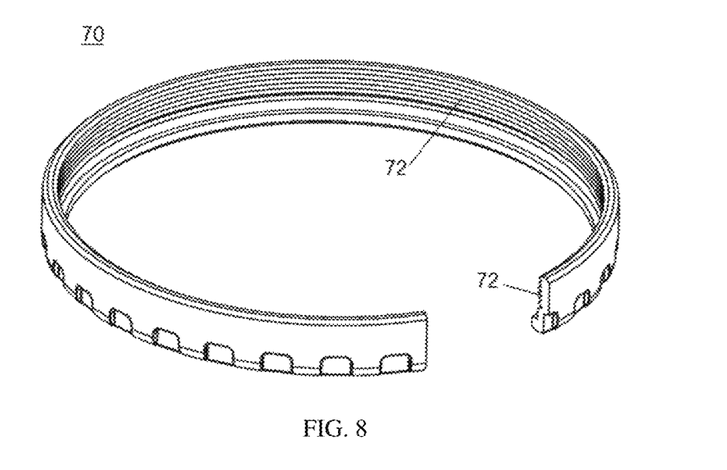
FIG. 8 is a perspective view of the preloading ring of FIG. 7 with a partial cros s-section removed to illustrate the threading and the preloading feature.

With reference to FIGS. 6-8, in one embodiment, the root portion 34 of the blade 22 includes a toroidal composite loop 42 configured to facilitate connection of the blade 22 to the blade retention assembly 32. The toroidal composite loop 42 wraps around an internal ring 44 and is joined to the internal ring 44 via a bond 46 at their mutual conforming surfaces. The internal ring 44 may be a monolithic or one-piece ring having a shape (e.g., a round or teardrop-shape) that conforms to a shape of an internal cavity formed by the composite loop 42.

The blade retention assembly 32 may include at least one sleeve configured to be bonded to or otherwise attached to the root portion 34 of the blade 22. The sleeve is configured to secure the blade 22 to a hub arm or other suitable connection point in a propulsion system. The sleeve may also include features to rotationally secure the blade 22 so that the blade 22 does not rotate about its longitudinal axis.

In one embodiment, as shown in FIGS. 6 and 7, the blade retention assembly 32 includes an outer sleeve 48 external to the toroidal loop 42 and/or the root portion 34 of the blade 22. The outer sleeve 48 at least partially conforms to an outer surface of the toroidal loop 42 and/or the root portion 34 and is bonded to or otherwise attached to the outer surface. The outer sleeve 48 may include various features to facilitate operable connection to the hub 20. For example, the outer sleeve includes a circumferential groove or depression 50 to accommodate a bearing assembly 52, and a circumferential groove 54 to accommodate a seal 56.

The outer sleeve 48 may include various design features, such as features configured to support a counter-weight as is sometimes required in twin propeller installations. For example, the outer sleeve 48 includes an extended portion having a substantially circumferential external groove that supports a counter-weight. In another example, the outer sleeve 48 includes an attachment member or "arm" that attaches to a flange or boss on an enlarged part of the outer sleeve 48. The attachment member allows a counter-weight to be connected to the outer sleeve 48.

The blade retention assembly 32 may also include an inner sleeve 60 that at least partially conforms to an inner surface of the toroidal loop 42 and/or the root portion 34 of the blade 22. For example, the inner sleeve defines a curved surface that conforms to part of an inner cavity of the root portion 34 and to the base of the toroidal loop 42. As is illustrated in FIGS. 6 and 7, the inner sleeve 60 has a cross-sectional shape including an at least partially vertical portion that conforms to an inner surface of the root portion 34, and a curved portion that partially wraps around the base of the loop 42. Both the at least partially vertical portion and the curved portion can thus be adhered to the root portion 34 and the toroidal loop 42.

The inner sleeve 60 may include one or more features that rotationally secure the inner sleeve 60 to the root portion 34 and/or the outer sleeve 48 to prevent relative rotation of the sleeves and the root portion 34. An indexing feature such as one castellated tooth, a plurality of teeth, a spline, or any other indexing feature can be included to prevent such relative rotation. Likewise, the outer sleeve 48 may also include one or more rotationally securing features. For example, as shown in FIG. 6, the inner sleeve 60 is circumferentially indexed to the outer sleeve 48 by a pattern of castellated teeth 68 on the inner sleeve 60 that mate with grooves in the outer sleeve 48. This ensures that one sleeve alone cannot lose its bond capacity and rotate without both sleeves losing the same capacity.

In one embodiment, both sleeves 60 and 48 are bonded with respective adhesives 64 and 66 to the conforming surfaces of the composite toroidal loop 42, and also outboard of the loop 42 where sleeve surfaces continue to conform to the blade composite. The outboard extent of adhesive bond and thickness of the bond may vary, and is best determined by analysis to streamline the transfer of load and improve conformity of shear stress distributions.

Other features can be included to facilitate attachment of the sleeves 60 and 48 to the root portion 34. For example, the inner sleeve 60 and/or the outer sleeve 48 include geometric shape features such as indentures or slight grooves that can be aligned along the longitudinal axis of the blade 22. Such features may be positioned circumferentially around mutual surfaces between the composite loop 42 and the inner and/or outer sleeve to index the blade composite root material to the sleeves, and act as mechanical lock in addition to the adhesive bond joint between metal parts of the sleeves and the composite blade structure.

The blade assembly 30 may also include features to allow the blade pitch to be changed. For example, the blade assembly 30 includes a pitch change pin 62 extending inwardly from the base of the blade and located eccentric to the blade longitudinal axis. The pin 62 interfaces with a blade pitch change mechanism (not shown) for the purpose of adjusting blade angle as desired to improve or optimize propulsor thrust according to aircraft operating condition.

The blade retention assembly 32 also includes a preloading component configured to at least partially surround the at least one sleeve and apply a residual compressive force to the sleeve and the root portion 34 of the blade 22. The preloading component, which may be a ring, a partial ring or other feature or component, applies a residual compressive force as a supplement to the compression force provided by centrifugal loads when the blade 22 is rotating with the hub 20. The residual compressive force increases the bending capacity of the blade root when the centrifugal load alone (which is typically low with lightweight composite blades) is insufficient to maintain compressive force all around the bond joint between the at least one sleeve and the root portion 34 when bending loads are applied.

In one embodiment, the preloading component is configured to apply the residual compressive force to one or more bonded areas (i.e., areas where the root portion 34 of the blade 22 is bonded to a sleeve). The compressive force supplements the bond's ability to prevent separation of the bond under conditions where the centrifugal force and the bond are insufficient to hold the sleeve to the blade 22, e.g., under bending conditions where the centrifugal force varies circumferentially around the blade retention assembly as discussed above.

In one embodiment, the preloading component is or includes a preloading ring 70 that surrounds at least the outer sleeve 48 and the root portion 34. For example, as shown in FIGS. 6-8, the preloading component is a preloading ring 70 that engages the outer sleeve 48 so that the preloading ring 70 applies a compressive force to press the outer sleeve 48 against an outer surface of the root portion 34. The preloading ring may include internal threads 72 that engage threads 74 in the outer diameter of the outer sleeve 48. The compressive force is applied at assembly and maintained by the ring 70 irrespective of whether the blade 22 is rotating during operation.

In one embodiment, the preloading ring 70 is configured to engage both the inner sleeve 60 and the outer sleeve 48 to pull the sleeves together, which compresses the sleeves against the bonded surfaces of the root portion 34. The preloading ring 70 includes a preloading feature, such as an internal preloading shoulder feature 76 (e.g., a flange). The preloading shoulder feature 76 engages the inner sleeve 60, so that the ring 70 engages both sleeves and thereby pulls them together. As the preloading ring 70 is threaded onto the outer sleeve 48, the ring 70 engages the threaded portion of the outer sleeve 48, and the flange 76 engages a circumferential protrusion 78 or other feature of the inner sleeve 60, and pulls the inner sleeve 60 toward the outer sleeve 48. This is done to apply a residual compressive force on the bonded composite toroidal loop assembly and prevent separation of the bond joint between both sleeves 48 and 60 and the conforming surfaces of the composite toroidal loop 42.

FIGS. 6 and 7 illustrate additional optional features of the blade root portion 34, which may be included when the blade 22 is a composite blade. One purpose of such features is to provide, for example, a means of balancing composite blades to one another, or to a master blade, to improve balance of the overall blade assembly 30. These features are illustrative and are not intended to be limiting, as other features or configurations may be employed for balancing.

For example, the blade 22 includes a foam core 80 internal to the composite in the blade root portion 34, which forms a central tubular cavity lined with a fiber reinforced liner 82. The liner 82 is sized to receive a blade balance tube 84, the inboard end of which is sealed with a removable plug 86. The blade balance tube 80 in this example also has a seal 88 near its outboard end that mates with the inner diameter of the foam liner 82. A balance weight 90 is positioned and secured inside the outboard tip of the balance tube 84. The seal 88 also serves as a vibration damper for the blade balance tube 84.

The preloading component is not limited to the above embodiments, as the preloading component can have any configuration suitable for applying a residual compressive force and increase bending capacity of a blade or blade assembly. For example, the preloading component can be a ring, a partial ring, one or more individual or connected clamping devices and others. The preloading component can be operably connected via any suitable mechanism, such as threading, an interference fit, one or more mechanical fasteners (e.g., screws or bolts) and others. In addition, although embodiments are described herein in relation to variable-pitch systems, they are not so limited. As an illustration, alternative configurations of the preloading component are described below.

Figure 9:
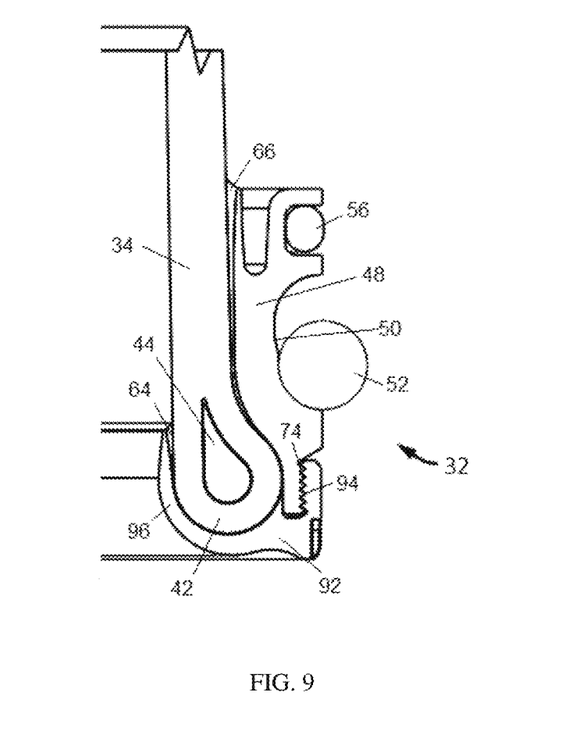
FIG. 9 is a cross-sectional view of a root portion of the propulsor blade assembly of FIG. 3, and aspects of an example of a blade retention assembly including a preloading inner sleeve.
Figure 10:
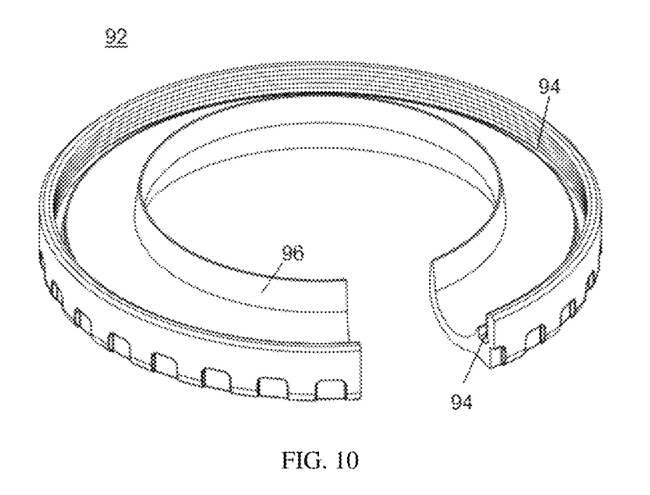
FIG. 10 is a perspective view of the preloading ring of FIG. 9 with a partial cross-section removed to illustrate the preloading inner sleeve.

FIGS. 9 and 10 show another example of the blade retention assembly 32, in which the blade retention assembly 32 includes two sleeves configured to be compressed against the blade root portion 34. One or both of the sleeves may be considered to be a preloading component. In this example, the blade retention assembly 32 includes the outer sleeve 48 bonded to an outer surface of the root portion 34 and to part of the toroidal loop 42. Instead of having a separate ring, the preloading component is configured as an inner sleeve 92 that engages the outer sleeve 48 and compresses against the toroidal loop 42 and/or the root portion 34. The inner sleeve 92 may include internal threads 94 that engage threads 74 in the outer diameter of the outer sleeve 48. In addition to the threading, the inner sleeve 92 may be bonded to the root portion 34. In one example, the inner sleeve 92 defines a curved portion 96 that conforms to part of the toroidal loop 42 and/or the root portion 34, e.g., partially wraps below and around (and may contact) the surface of the root portion 34 opposite to the outer sleeve 48. The blade retention assembly 32 can be engaged to apply the residual compressive force by threading the inner sleeve 92 onto the outer sleeve 48 to pull the inner and outer sleeves together around the root portion 34. A bonding adhesive may be applied between the inner sleeve 92 and the root portion 34 and cured after the inner sleeve 92 has been sufficiently tightened.

Figure 11:
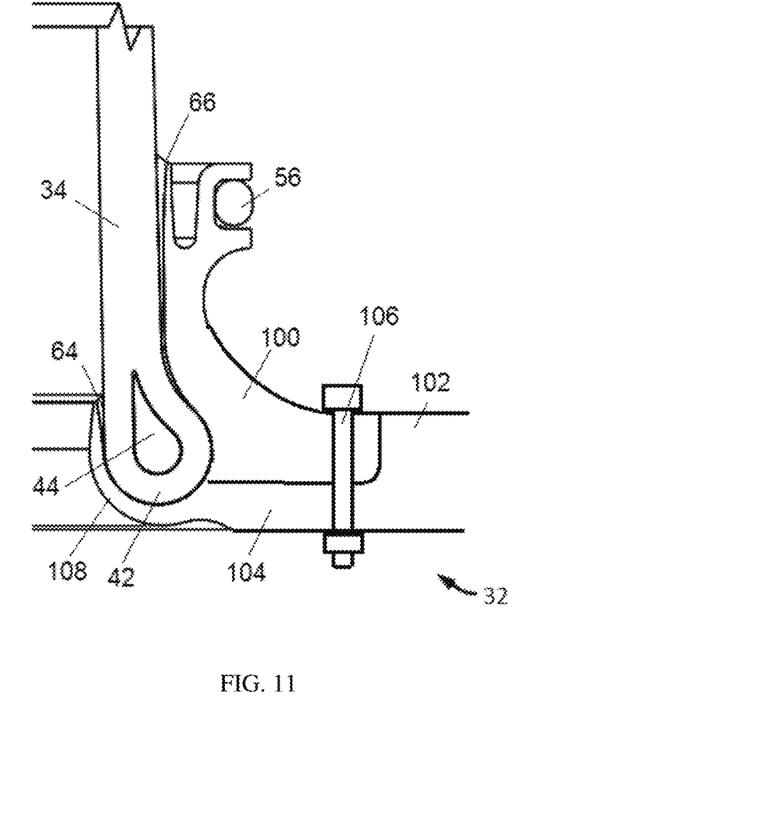
FIG. 11 is a cross-sectional view of a root portion of the propulsor blade assembly of FIG. 3, and aspects of a blade retention assembly including inner and outer sleeves compressed against a root portion of a composite blade.

FIG. 11 shows a further example of the blade retention assembly 32, which is configured so that the preloading component can be engaged using a mechanical fastener. In this example, the blade retention assembly 32 includes an outer sleeve or component 100 configured to be bonded to an outer surface of the root portion 34 and to part of the toroidal loop 42, and a preloading component 102 having a flange portion 104 that extends inwardly toward the root portion 34 and engages the root portion 34, e.g., by at least partially surrounding the toroidal loop 42. The preloading component 102 and/or the flange portion 104 includes one or more holes that align with respective holes in the outer sleeve 100, through which a bolt 106 or other fastener is inserted and used to pull the sleeves 100 and 102 together, thereby applying a residual compressive force on the toroidal loop of root portion 34. In addition to the bolt 106, the preloading component 102 may be bonded to the root portion 34. Similar to the previous example of FIGS. 9 and 10, the preloading component may define a curved portion 108 that conforms to part of the toroidal loop 42 and/or the root portion 34.

Embodiments described herein present a number of improvements and advantages relative to prior art configurations. The blade retention assembly and the preloading component can greatly increase the strength of composite blade designs, and greatly increase the ability to resist high levels of steady and cyclic bending loads experienced by high-power propulsion systems. In addition, the blade retention assembly and the preloading component allow for the use of compact and lightweight attachment mechanisms in propulsion systems. Such attachment mechanism interface reliably well in, e.g., central hub assemblies having a bearing and retention system for each blade, which allows for changing blade pitch angles to accommodate changing flight conditions encountered in typical flight profiles of various aircraft.

Embodiments described herein make additional reductions possible in the diameter and weight of the root portion of a composite blade, while simultaneously increasing bending capacity. Decreasing the diameter of the blade root provides additional weight reduction and aerodynamic performance benefits to the entire aircraft propulsion system of current and "next generation" aircraft, where the trend is to increase the number of blades to reduce propulsor external noise and vibration transmitted to passengers.

Manufacturers of new aircraft propellers look to increase blade count in new propellers for many reasons. The root diameter of composite blades is typically quite large and heavy to accommodate high-cycle vibratory bending loads. Packaging the large retention bearings of this many blades in a central hub requires a large hub, large pitch change system, and large center body (known as a spinner assembly) to maintain smooth airflow around the root portions of the blades. One benefit of the embodiments described herein is to allow a reduction in the size of each blade root diameter, retention assembly and blade support bearing(s), which in turn results in a smaller, more compact hub, pitch change system and spinner size, accompanied by an appreciable reduction in propeller weight, while simultaneously improving propeller efficiency. Furthermore, the reduction in blade root diameter is also seen to decrease blade inboard airfoil thickness, which helps prevent drag arising from choked air flow between blade roots, thus also improves propeller aerodynamic performance.

Although embodiments are described herein in conjunction with aircraft, they are not so limited and can be used in any suitable device or system that utilizes rotor blades. For example, rotor blades can be used in green energy capturing devices such as wind turbines and water turbines.

The terms "first," "second," and the like, herein do not denote any order, quantity, or importance, but rather are used to distinguish one element from another. In addition, the terms "a" and "an" herein do not denote a limitation of quantity, but rather denote the presence of at least one of the referenced item.

Although this invention has been shown and described with respect to the detailed embodiments thereof, it will be understood by those of skill in the art that various changes may be made and equivalents may be substituted for elements thereof without departing from the scope of the invention. In addition, modifications may be made to adapt a particular situation or material to the teachings of the invention without departing from the essential scope thereof.

Therefore, it is intended that the invention not be limited to the particular embodiments disclosed in the above detailed description, but that the invention will include all embodiments falling within the scope of the foregoing description.

What is claimed is:

1. A retention assembly for a propulsor blade including a root portion that forms a circumferential structure having an inner surface and an outer surface, the retention assembly comprising:
   an inner sleeve fixedly attached to the inner surface of the circumferential structure of the root portion;
   an outer sleeve fixedly attached to the outer surface of the circumferential structure of the root portion; and
   a preloading component configured to at least partially surround the root portion, the inner sleeve and the outer sleeve to apply a residual compressive force to maintain an attachment of both the inner sleeve and the outer sleeve to the root portion of the propulsor blade;
   wherein the preloading component includes a first set of threads configured to engage a second set of threads on the outer sleeve, and includes a flange configured to engage a respective feature on the inner sleeve, the preloading component configured to apply the residual compressive force by pulling together the inner sleeve and the outer sleeve via the flange as the first set of threads is engaged with the second set of threads.

2. The retention assembly of claim 1, wherein the residual compressive force acts to maintain a compressive load on the at least one sleeve and the root portion to prevent separation of the at least one sleeve from the root portion due to a variation in centrifugal forces during rotation of the propulsor blade.

3. The retention assembly of claim 1, wherein the preloading component is a preloading ring.

4. The retention assembly of claim 1, wherein the inner sleeve and the outer sleeve are fixedly attached to the circumferential structure by an adhesive to form a bond joint between the inner sleeve, the outer sleeve and the circumferential structure, the compressive force configured to prevent separation of the bond joint.

5. The retention assembly of claim 1, further comprising an indexing feature on the inner sleeve that mates with a corresponding feature on the outer sleeve to prevent rotation of the inner sleeve relative to the outer sleeve.

6. The retention assembly of claim 1, wherein the rotor blade is made from a composite material.

7. The retention assembly of claim 1, wherein the root portion of the propulsor blade includes a toroidal loop.

8. A blade assembly comprising:
   a propulsor blade having a root portion that forms a circumferential structure having an inner surface and an outer surface;
   an inner sleeve fixedly attached to the inner surface of the circumferential structure of the root portion;
   an outer sleeve fixedly attached to the outer surface of the circumferential structure of the root portion; and
   a preloading ring configured to at least partially surround the root portion, the inner sleeve and the outer sleeve to apply a residual compressive force to maintain an attachment of both the inner sleeve and the outer sleeve to the root portion of the propulsor blade;
   wherein the preloading ring includes a first set of threads configured to engage a second set of threads on the outer sleeve.

9. The blade assembly of claim 8, wherein the inner sleeve and the outer sleeve are fixedly attached to the circumferential structure by an adhesive to form a bond joint between the inner sleeve, the outer sleeve and the circumferential structure, the compressive force configured to prevent separation of the bond joint.

10. The blade assembly of claim 8, wherein the preloading ring includes a flange configured to engage a respective feature on the inner sleeve, the preloading ring configured to apply the residual compressive force by pulling together the inner sleeve and the outer sleeve via the flange as the first set of threads is engaged with the second set of threads.

11. The blade assembly of claim 8, further comprising an indexing feature on the inner sleeve that mates with a corresponding feature on the outer sleeve to prevent rotation of the inner sleeve relative to the outer sleeve.

12. The blade assembly of claim 8, wherein the root portion of the propulsor blade includes a toroidal loop.

13. A retention assembly for a propulsor blade including a root portion that forms a circumferential structure having an inner surface and an outer surface, the retention assembly comprising:
   an inner sleeve fixedly attached to the inner surface of the circumferential structure of the root portion;
   an outer sleeve fixedly attached to the outer surface of the circumferential structure of the root portion; and
   a preloading ring configured to at least partially surround the root portion, the inner sleeve and the outer sleeve to apply a residual compressive force to maintain an attachment of both the inner sleeve and the outer sleeve to the root portion of the propulsor blade;
   wherein the preloading ring includes a first set of threads configured to engage a second set of threads on the outer sleeve.

14. The retention assembly of claim 13, wherein the residual compressive force acts to maintain a compressive load on the at least one sleeve and the root portion to prevent separation of the at least one sleeve from the root portion due to a variation in centrifugal forces during rotation of the propulsor blade.

15. The retention assembly of claim 13, wherein the inner sleeve and the outer sleeve are fixedly attached to the circumferential structure by an adhesive to form a bond joint between the inner sleeve, the outer sleeve and the circumferential structure, the compressive force configured to prevent separation of the bond joint.

16. The retention assembly of claim 13, further comprising an indexing feature on the inner sleeve that mates with a corresponding feature on the outer sleeve to prevent rotation of the inner sleeve relative to the outer sleeve.

17. The retention assembly of claim 13, wherein an inner surface of the outer sleeve and an outer surface of the inner sleeve are configured to at least partially conform respectively to the outer surface and the inner surface of the root portion of the propulsor blade.

18. The retention assembly of claim 13, wherein the root portion of the propulsor blade includes a toroidal loop.

19. A retention assembly for a propulsor blade including a root portion that forms a circumferential structure having an inner surface and an outer surface, the retention assembly comprising:
   an outer sleeve fixedly attached to the outer surface of the circumferential structure of the root portion; and
   an inner sleeve fixedly attached to the inner surface of the circumferential structure of the root portion, the inner sleeve including a preloading structure configured to at least partially surround the root portion and the outer sleeve to apply a residual compressive force to maintain an attachment of both the inner sleeve and the outer sleeve to the root portion of the propulsor blade;

wherein the preloading structure includes a first set of threads configured to engage a second set of threads on the outer sleeve.

20. The retention assembly of claim 19, wherein an inner surface of the outer sleeve and an outer surface of the inner sleeve are configured to at least partially conform respectively to the outer surface and the inner surface of the root portion of the propulsor blade.

\* \* \* \* \*